United States Patent [19]

Sigg

[11] Patent Number: 4,856,914
[45] Date of Patent: Aug. 15, 1989

[54] THRUST BEARING ARRANGEMENT

[75] Inventor: Hans Sigg, Mutschellen, Switzerland

[73] Assignee: Maag Gear-Wheel & Machine Company Limited, Zurich, Switzerland

[21] Appl. No.: 138,147

[22] Filed: Dec. 28, 1987

[30] Foreign Application Priority Data

Jan. 26, 1987 [CH] Switzerland .................. 254/87

[51] Int. Cl.⁴ .................... F16C 17/06; F16C 27/02
[52] U.S. Cl. .................... 384/223; 384/224; 384/304; 384/424
[58] Field of Search ........... 384/121, 124, 223–225, 384/248, 249, 251, 264, 265, 303, 304, 306, 308, 309, 312, 420, 424, 426

[56] References Cited

U.S. PATENT DOCUMENTS

| 433,143 | 7/1890 | Peck | 384/303 X |
|---|---|---|---|
| 1,268,906 | 6/1918 | Wintroath | 384/121 |
| 1,425,979 | 8/1922 | Kingsbury | 384/224 |
| 3,043,637 | 7/1962 | Biedendieck et al. | 384/426 |
| 3,734,581 | 5/1973 | Le Breton | 384/304 |
| 4,033,647 | 7/1977 | Beavers | 384/223 X |
| 4,168,101 | 9/1979 | DiGrande | 384/224 |

FOREIGN PATENT DOCUMENTS 2113250  9/1972  Fed. Rep. of Germany .

Primary Examiner—Thomas R. Hannon
Attorney, Agent, or Firm—Pollock, Vande Sande & Priddy

[57] ABSTRACT

A thrust bearing arrangement in which individual thrust bearings are arranged in a plurality of stages. These bearings are connected to thrust-load adjustment devices (1st type with travel limitation, 2nd type without travel limitation) as a result of which the beginning of load-carrying by each bearing can be determined as a result of an adjustable initial tensioning.

26 Claims, 4 Drawing Sheets

THRUST BEARING ARRANGEMENT

TECHNICAL FIELD

The invention relates to a thrust bearing arrangement in accordance with the preamble to claim 1.

BACKGROUND OF THE INVENTION

Thrust bearing arrangements of this type hitherto known, as for example in DE No. 21 13 250, comprise a plurality of individual plain bearings arranged axially one behind the other to take up the thrust load, bearing gaps of different size being provided at the individual plain bearings. The bearing as a whole is acted upon by a constant stream of oil.

This thrust bearing arrangement has the disadvantage that the various bearing clearances and inaccuracies in manufacture and installation can more or less only be compensated by a high stream of lubricating oil. The expense on power loss and secondary installations is therefore very high.

In contrast, it is the object of the invention to provide a thrust bearing arrangement wherein the load can be distributed over a plurality of stages in a manner which can be predetermined and adjusted or controlled.

According to the invention, this problem is solved by the features described in the main claim. In addition, such a thrust bearing arrangement may also comprise the features of the remaining claims.

The advantages of the thrust bearing arrangement according to the invention consist preferably in the very differentiated adjustability of the thrust load carrying for the individual bearing regions as well as in the possibility, with this adjustability, of distributing the bearing loading uniformly or in a graduated manner or in a manner adapted to possible operating states. At the same time, the compensation for possible bending of the shaft is fully retained and this does not have any disturbing influence on the carrying characteristics. In this connection, the thrust bearing arrangement may also be made capable of wobbling.

BRIEF DESCRIPTION OF THE DRAWINGS

Further details and features can be seen from the description of exemplary forms of embodiment with reference to the drawing, in which.

DESCRIPTION OF BEST MODE AND OTHER EMBODIMENTS

Figures 1A, 1B:
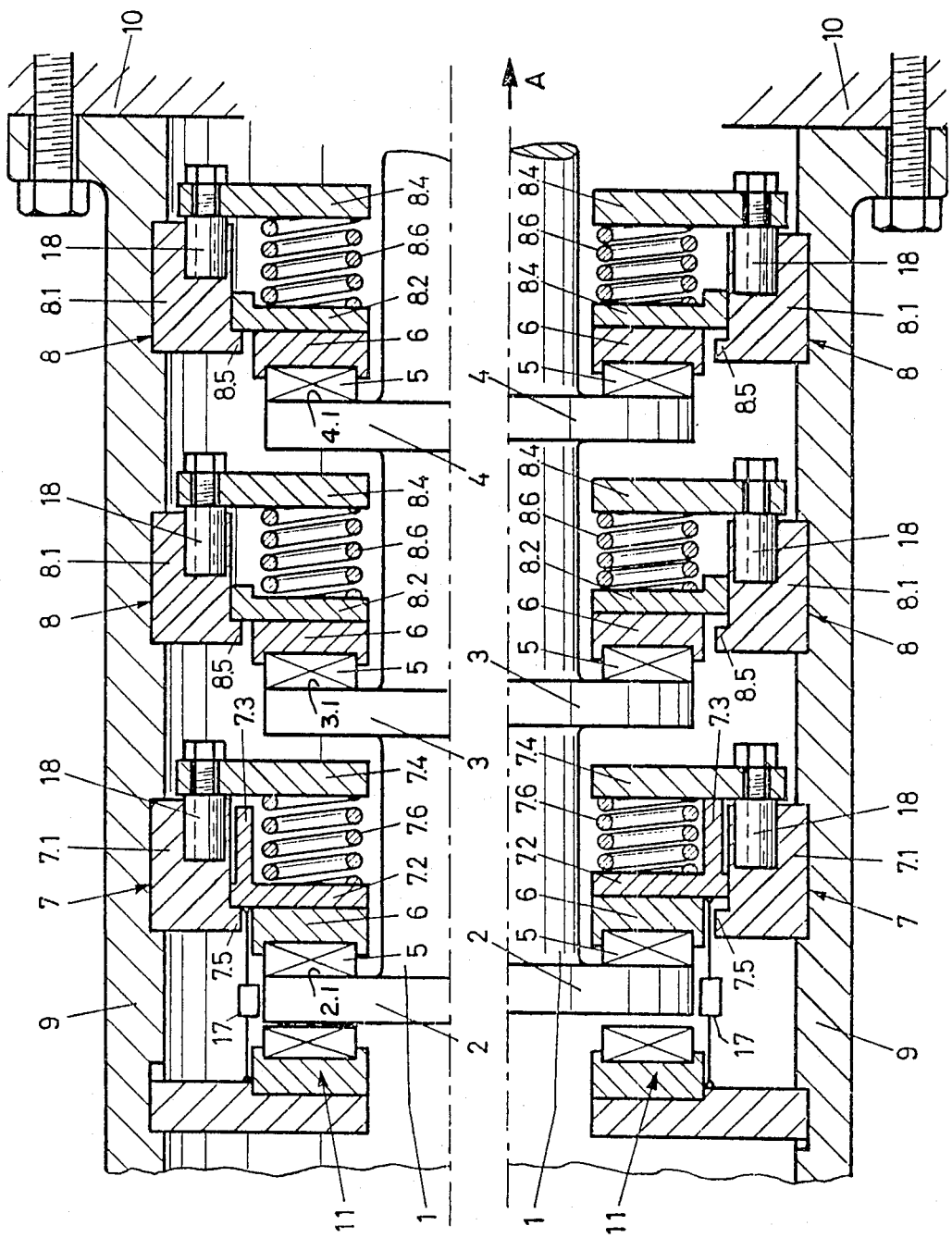
FIG. 1a shows a thrust bearing arrangement with thrust load=0.
FIG. 1b shows a thrust bearing arrangement with thrust load>0.

A shaft 1 (FIG. 1a) comprises three flange-like shaft collars, 2, 3, 4 and is mounted in a radial bearing (not illustrated). Bearing means 5 are disposed opposite a first face 2.1, 3.1, 4.1 of each shaft collar 2, 3, 4 in a manner usual with thrust bearings. These bearing means are preferably bearing pads. These bearing means 5 are each held in at least one support 6, each of which is connected to at least one thrust-force adjustment device 7, 8. These thrust-force adjustment devices 7, 8 are seated in a thrust bearing housing 9 which is mounted on a radial-bearing housing or another machine housing 10. Opposite the shaft collar 2 at the end of the shaft 1, 7 is connected to the support 6 for the bearing means 5 whereas opposite the other internal shaft collars 3 and 4, two thrust-bearing adjustment devices of the 2nd type 8 are connected to the support 6 for the bearing means 5.

The thrust-force adjustment device of the 1st type 7 comprises a device housing 7.1 which is seated in the thrust-bearing housing 9 and carries at least one first pressure plate of the 1st type 7.2 for sliding displacement. This first pressure plate of the 1st type 7.2 comprises at least one supporting element 7.3 which extends towards a second pressure plate 7.4 and can be brought to bear against this. This first pressure plate of the 1st type 7.2 can be brought to bear against a stop 7.5 by the side adjacent to the support 6 for the bearing means 5. The second pressure plate 7.4 is variably or adjustably connected to the device housing 7.1 by an adjustment device 18. At least one springy element, for example at least one helical spring 7.6 is disposed between these two pressure plates, bearing against these.

The thrust-force adjustment device of the 2nd type 8 is practically the same in construction as the thrust-force adjustment device 7. It likewise comprises a device housing 8.1 which is seated in the thrust-bearing housing 9 and carries at least one first pressure plate of the 2nd type 8.2 for sliding displacement. This first pressure plate of the 2nd type 8.2 can be brought to bear against a stop 8.5 by the side adjacent to the support 6 for the bearing means 5. Opposite the first pressure plate of the 2nd type 8.2, a second pressure plate 8.4 is variably or adjustably connected to the device housing 8.1 by an adjustment device 18 and at least one springy element, for example at least one helical spring 8.6 is disposed between these pressure plates, bearing against them.

Provided opposite a second external face of the shaft collar 2, with the usual bearing clearance in the state of rest, is an opposed bearing 11 to take up an opposing thrust force, which bearing is likewise seated in the thrust-bearing housing 9. This opposed bearing can likewise be constructed in the form of a pivoted-pad bearing of conventional construction and be provided with bearing-clearance adjustment means 17 to adjust the bearing clearance in relation to the main bearing.

The devices for the supply of oil to the bearing means and other subassemblies may be constructed in conventional manner.

In the state of rest, that is to say with an axial thrust A with the value 0, the shaft collar 2 is between the opposed bearing 11 and the bearing means of the thrust-force adjustment device of the 1st type 7. The other shaft collars 3, 4 are also in front of the bearing means 5 associated with them or have a small clearance between the shaft collars 3, 4 and the bearing means 5 associated with them.

In a first operational variant, within the individual stages which are associated with the three shaft collars 2, 3, 4, like thrust-force adjustment devices of the 1st or 2nd type are installed singly or in multiple numbers but are differently prestressed from stage to stage in that the springy elements are initially tensioned accordingly by the second pressure plates 7.4 or 8.4 and by adjustment devices 18 disposed between each of these and the corresponding device housings 7.1, 8.1. The bearing clearances also differ in size in individual stages and these increase from the machine housing 10 outwards.

When the axial thrust A begins to increase, the shaft collar 4 carries the load at first and sooner or later the shaft collar 3 and the shaft collar 2 according to the set initial tension or opposing force of the thrust force adjustment devices. On a further increase in the axial thrust A, the shaft 1 is displaced until at least one of the supporting elements 7.3 of the thrust-force adjustment device of the 1st type bears against the second pressure plate 7.4. Any further increase in axial thrust is now taken up by this pressure plate 7.4.

In a second operational variant of the thrust bearing arrangement, the shaft collars 2, 3, 4 can be mounted with the same bearing clearance in relation to the bearing means 5 as a result of which all stages begin to carry the load simultaneously on an increase in the axial thrust A. Here, too, the axial displacement of the shaft 1 is only effected until at least one of the supporting elements 7.3 of the thrust-force adjustment device of the 1st type 7 comes to bear against the second pressure plate and this takes up the further residual whole or proportional axial thrust A.

The taking up of axial thrust to different extents by the individual stages can be achieved by different spring elements, that is to say those with different characteristic curves for building up the opposing force.

In FIG. 1b, the thrust bearing arrangement is illustrated with axial thrust introduced of such a magnitude that all stages are load-bearing and the supporting element 7.3 of the first pressure plate of the 1st type 7.2 is bearing against the second pressure plate 7.4.

In a modification of a thrust bearing arrangement, it may be an advantage, instead of the second pressure plates 7.4, 8.4 which are connected to the device housing 7.1, 8.1, to use a positioning and fine-adjustment device 18 for them and so for the initial tensioning forces.

It is also possible, however, to construct the thrust-force adjustment device of the 1st type 7 without a springy element 7.6, that is to say substantially in the form of a fixed bearing. In this case, the bearing clearances must be adjusted so that the shaft collars 3 and 4 take up thrust load first and only then does the supporting element 7.3 come to bear against the second pressure plate 7.4.

Figure 2A:
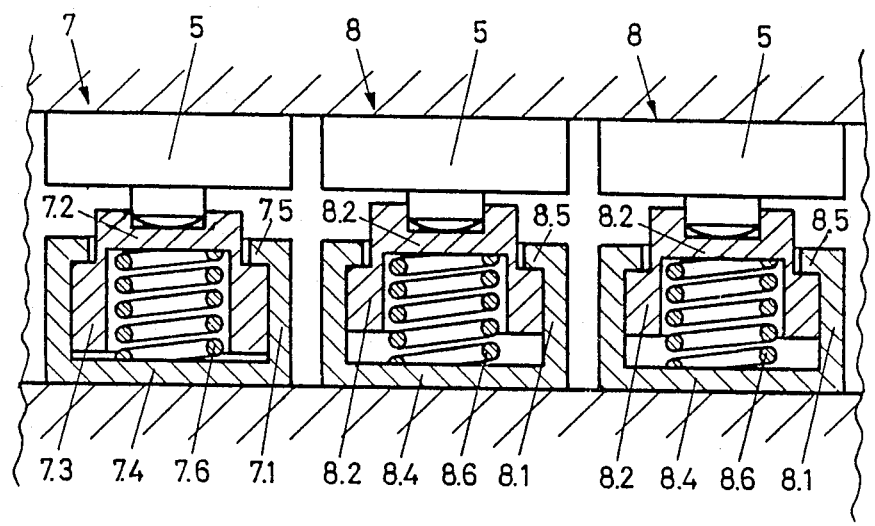
FIG. 2a shows a thrust bearing arrangement capable of wobbling—as a detail.
Figure 2B:
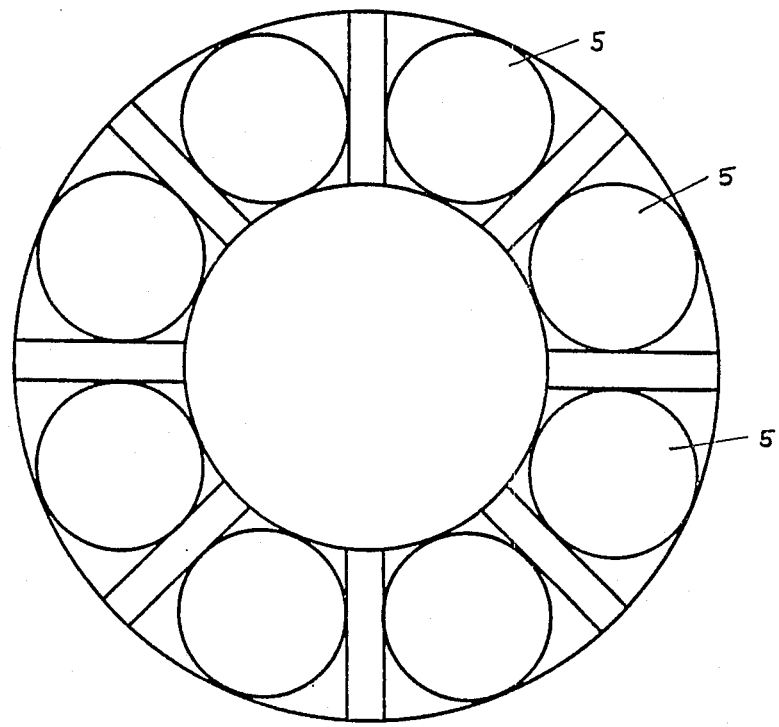
FIG. 2b shows a thrust bearing arrangement capable of wobbling—as a view from above.

In a further form of embodiment of the thrust bearing arrangement according to the invention (FIG. 2), a thrust-force adjustment device of the 1st type 7 may be provided in only one bearing stage and even there only in one part. This arrangement has the advantage that the bearing stages can wobble.

In yet another form of embodiment of the thrust bearing arrangement according to the invention, when a plurality of thrust-force adjustment device 7, 8 are used in each of the bearing stages, they may be adjusted within a bearing stage so that the load-carrying bearing of the shaft collar 2 or 3 or 4 against the bearing means 5 occurs at different moments of time within at least one of the stages.

Figure 3:
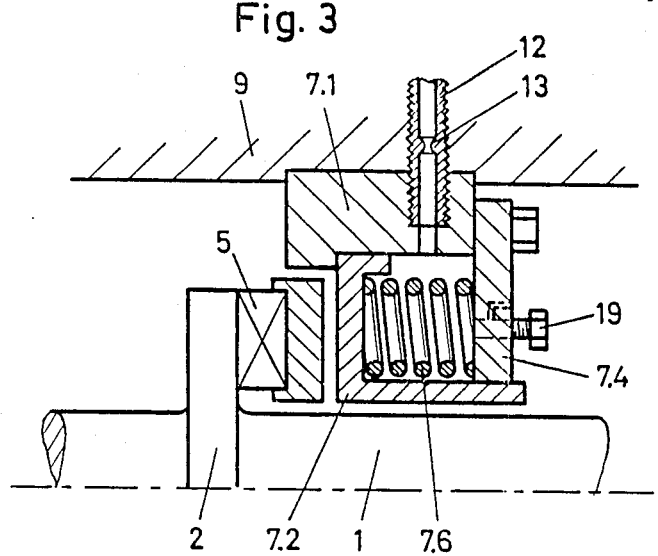
FIG. 3 shows a damping device.

It is also possible, however, to provide a damping device 12, 13 (FIG. 3) in each of the thrust-force adjustment devices 7, 8 to dampen axial vibrations of the shaft. Such a damping device 12, 13 may, for example, be integrated in the device housing 7.1, 8.1 of a thrust-force adjustment device 7, 8, its housing and the pressure plates being of oil-tight construction. At one point in the housing 7.1, 8.1, there opens a connecting pipe 12 to a compensating tank (not illustrated), which pipe is provided with a throttle 13 which may be adjustable, and these form the damping device. In addition, one of the pressure plates may comprise a vent screw (19) for example. This can also be constructed in the form of a regulating throttle.

Figure 4:
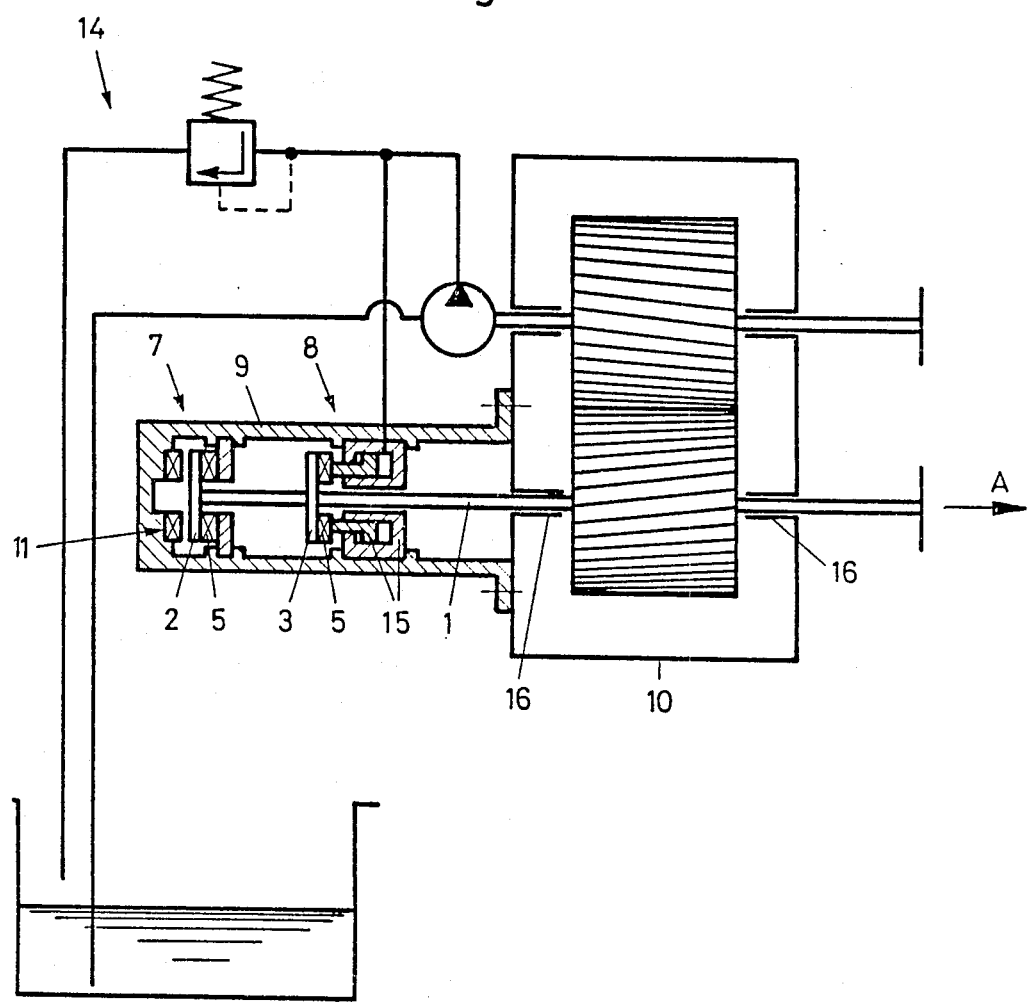
FIG. 4 shows a hydraulic modification of a thrust bearing arrangement.

In a further form of embodiment of a thrust bearing arrangement, the thrust-force adjustment devices (1st type and 2nd type) 7, 8 may be constructed in the form of single-acting or double-acting piston-cylinder devices 15 which are connected to a conventional control or regulating circuit 14, instead of springy elements (FIG. 4). In this case, the first pressure plate of the 1st type can fulfill the function of a piston, of the pressure plate and/or of the supporting element.

Figure 5:
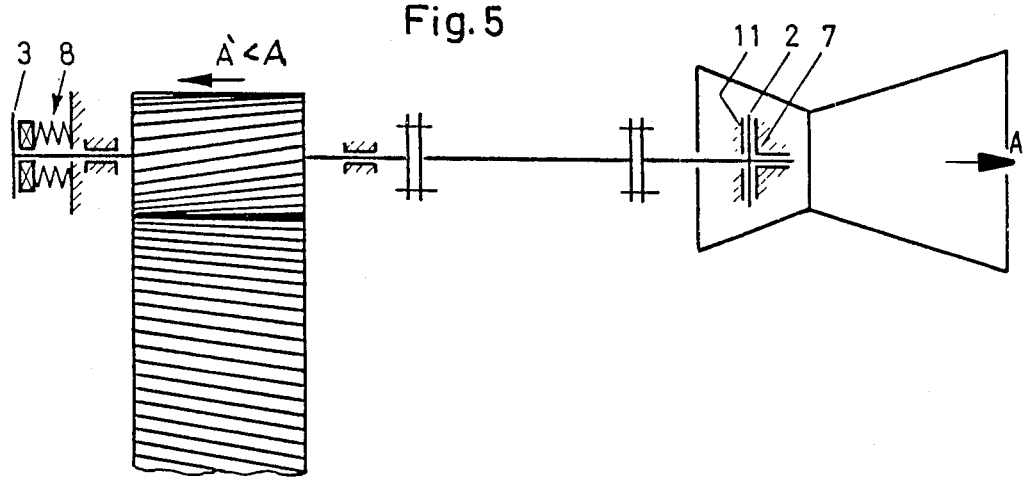
FIG. 5 shows a split thrust bearing arrangement.

In a further form of embodiment of the thrust bearing arrangement, some bearing stages may be disposed spatially separated from other bearing stages. For example the bearing stage limiting the axial displacement (which contains the thrust-force adjustment device of the 1st type) may be situated in the vicinity of a turbo-engine whereas the other bearing stages, separated by couplings and intermediate shafts, are in the region of a gear (FIG. 5). Particularly in combination with an opposed bearing 11, a maximum possible protection of the turbo-engine can thus be achieved by a very precise axial mounting of its rotors, because fewer components make contributions to the displacements as a result of heat expansion.

In a further form of embodiment, at least one thrust-force adjustment device of the 1st type 7 may be provided in at least one second stage. In this case, however, the thrust-force adjustment devices of the 1st type belonging to the various stages are adjusted so that they do not bear simultaneously with their supporting elements 7.3 against the particular second pressure plates 7.4. That is to say that the springless load-carrying is effected successively and only when the other stage has been damaged for example (because of faults in the material, overloading, poor lubrication etc.) and is practically out of commission. In this case when the load begins to be carried, a signal can be generated via supporting element 7.3 in this stage, which signal is transmitted to the instrument panel of the operational monitoring system and there indicates that the installation may only continue to be operated with a certain maximum load.

A thrust bearing arrangement according to the invention can be used wherever very high thrust loads occur which can no longer be taken up by a single-stage thrust bearing for material reasons or as a result of constructional reasons. This may be the case in turbo-engines, screw extruder installations etc.

I claim:

1. A thrust bearing arrangement for taking up high thrust forces on a shaft comprising a thrust bearing housing and bearing means in said bearing housing having a plurality of bearing elements for taking up the thrust forces, said bearing means including first and second thrust force adjustment devices arranged respectively in first and second stages spaced axially from each other, each of said adjustment devices comprising:
   a thrust force adjustment housing carried by said bearing housing;
   a first pressure member secured to said adjustment housing;

a second pressure member seated in said adjustment housing in spaced relation to said first pressure member and disposed for axial movement relative to said first pressure member in response to the thrust forces on said shaft, said second pressure member having first and second sides and at least one of said bearing elements being mounted on said first side of said second pressure member;

resistance means for providing a resistance force resisting movement of said members toward each other; and, adjusting means for adjusting the share of the thrust load borne by the respective stages.

2. A thrust bearing arrangement according to claim 1 wherein said adjusting means is adjustable such that all the bearing means begin to carry a share of said thrust force simultaneously.

3. A thrust bearing arrangement according to claim 1 wherein said adjusting means is adjustable such that all the bearing means begin to carry said thrust force in a staggered arrangement in time.

4. A thrust bearing arrangement according to claim 1 wherein said adjusting means is adjustable such that said second thrust force adjustment device does not take up a share of said thrust force until said first thrust force adjustment device carries a predetermined load.

5. A thrust bearing arrangement according to claim 1 wherein said adjusting means includes means for adjusting the amount of thrust force taken up by the bearing element of the first stage before the bearing element of the second stage takes up a share of said thrust force.

6. A thrust bearing arrangement according to claim 1 wherein at least two of said stages are separated by shaft couplings.

7. A thrust bearing arrangement according to claim 1 wherein said stages are disposed adjacent to one another.

8. A thrust bearing arrangement according to claim 1 wherein at least one of said thrust force adjustment devices includes limit means for limiting the movement of said first and second pressure members toward each other.

9. A thrust bearing arrangement according to claim 8 wherein said limit means comprises a stop element secured to one of said pressure members and extending toward the other of said pressure members.

10. A thrust bearing arrangement according to claim 1 wherein the respective resistance means of said stages provides resistance forces which are different from each other.

11. A thrust bearing arrangement according to claim 10 wherein said respective resistance means each comprises a plurality of tensioned springs, the springs of different ones of said stages being tensioned by different amounts.

12. A thrust bearing arrangement according to claim 10 wherein said thrust force adjustment devices are individually controllable.

13. A thrust bearing arrangement according to claim 1 further comprising a plurality of collars carried by said shaft for cooperating with said bearing elements, and wherein the spacings between the bearing elements and the cooperating collars are different from each other such that the second pressure members of said stages commence axial movement at different times.

14. A thrust bearing arrangement according to claim 1 further comprising at least one opposed bearing means having at least one opposed bearing element for taking up an opposing thrust force.

15. A thrust bearing arrangement according to claim 14 wherein said opposed bearing means comprises bearing play adjustment means for adjusting the spacing between said at least one bearing element and said at least one opposed bearing element.

16. A thrust bearing arrangement according to claim 1 wherein said thrust force adjustment device comprises means for presetting an axial position of said shaft.

17. A thrust bearing arrangement according to claim 1 wherein said resistance means further comprises at least one pressure means for providing a fluid pressure between said first and second pressure members for damping axial vibration of said shaft.

18. A thrust bearing arrangement according to claim 1 wherein said resistance means in at least one of said thrust force adjustment devices comprises at least one spring element disposed between said first and second pressure members, and wherein said adjusting means comprises means for adjusting the spring force of said spring element.

19. A thrust bearing arrangement according to claim 1 wherein said resistance means in at least one of said thrust force adjustment devices comprises pressure means for applying fluid pressure between said first and second pressure members, and wherein said adjusting means comprises means for adjusting said fluid pressure.

20. A thrust bearing arrangement for taking up high thrust forces on a shaft comprising a thrust bearing housing and bearing means in said bearing housing having at least one bearing element for taking up the thrust forces, said bearing means including at least one thrust force adjustment device comprising:

a thrust force adjustment housing carried by said bearing housing;

a first pressure member secured to said adjustment housing;

a second pressure member seated in said adjustment housing in spaced relation to said first pressure member and disposed for axial movement relative to said first pressure member in response to thrust forces on said shaft, said second pressure member having first and second sides and said at least one bearing element being mounted on said first side of said second pressure member;

resistance means comprising at least one spring element disposed between said first and second pressure members for providing a spring force resisting movement of said members toward each other;

stop means disposed adjacent to said second pressure member for retaining said second pressure member in position for achieving an initial tensioning force in said spring element; and, limit means for limiting the axial movement of said shaft; and, adjusting means for adjusting the amount of said spring force.

21. A thrust bearing arrangement according to claim 20 wherein adjustment means is provided for adjusting the initial tension in said spring element.

22. A thrust bearing arrangement according to claim 20 wherein said adjusting means comprises means for presetting an axial position of said shaft.

23. A thrust bearing arrangement according to claim 20 wherein said bearing means is arranged in a plurality of stages and at least two of said stages include thrust force adjustment devices in which the spacings between the bearing elements of said devices and cooperating collars carried by said shaft are different from each other such that thrust forces on said shaft are taken up by said bearing means in a stepwise fashion.

24. A thrust bearing arrangement for taking up high thrust forces on a shaft comprising a thrust bearing housing and bearing means in said bearing housing having at least one bearing element for taking up the thrust forces, said bearing means including at least one thrust force adjustment device comprising:
 a thrust force adjustment housing carried by said bearing housing;
 a first pressure member secured to said adjustment housing;
 a second pressure member seated in said adjustment housing in spaced relation to said first pressure member and disposed for axial movement relative to said first pressure member in response to the thrust forces on said shaft, said second pressure member having first and second sides and said at least one bearing element being mounted on said first side of said second pressure member;
 resistance means comprising at least one spring element disposed between said first and second pressure members for providing a spring force resisting movement of said members toward each other; and,
 adjusting means for adjusting the amount of said spring force.

25. A thrust bearing arrangement according to claim 24 wherein said bearing means includes a plurality of said bearing elements arranged in a plurality of stages spaced axially from one another and wherein each of at least two of said stages is provided with a corresponding one of said thrust force adjustment devices.

26. A thrust bearing arrangement according to claim 24 wherein said bearing means comprises a plurality of said bearing elements arranged in at least two stages, one of said stages having the said at least one thrust force adjustment device and the other of said stages having a second thrust force adjustment device comprising:
 a second thrust force adjustment housing carried by said bearing housing;
 a third pressure member secured to said second adjustment housing;
 a fourth pressure member seated in said second adjustment housing in spaced relation to said third pressure member and disposed for axial movement relative to said third pressure member in response to the thrust forces on said shaft, said fourth pressure member having first and second sides, and another of said bearing elements being mounted on said first side;
 second resistance means comprising at least one pressure means for providing a fluid pressure between said third and fourth pressure members to resist movement of said members toward each other; and,
 adjustment means for adjusting the amount of said fluid pressure.

* * * * *